United States Patent
Cooney et al.

(10) Patent No.: US 11,909,232 B2
(45) Date of Patent: Feb. 20, 2024

(54) SMART CHARGING SYSTEM

(71) Applicant: Arroe Limited, London (GB)

(72) Inventors: Eoin Cooney, London (GB); Niall McGuinness, London (GB)

(73) Assignee: Arroe Limited, London (GB)

( * ) Notice: Subject to any disclaimer, the term of this patent is extended or adjusted under 35 U.S.C. 154(b) by 471 days.

(21) Appl. No.: 17/307,714

(22) Filed: May 4, 2021

(65) Prior Publication Data

US 2021/0257845 A1 Aug. 19, 2021

Related U.S. Application Data

(63) Continuation of application No. PCT/EP2019/073779, filed on Sep. 5, 2019.

(30) Foreign Application Priority Data

Nov. 7, 2018 (GB) ...................................... 1818162
Nov. 7, 2018 (GB) ...................................... 1818165

(51) Int. Cl.
*H01M 10/44* (2006.01)
*H01M 10/46* (2006.01)
*H02J 7/00* (2006.01)

(52) U.S. Cl.
CPC ........ *H02J 7/00034* (2020.01); *H02J 7/0013* (2013.01)

(58) Field of Classification Search
CPC .... H02J 7/0068; H02J 7/0013; H02J 7/00034; H02J 7/00032

(Continued)

(56) References Cited

U.S. PATENT DOCUMENTS 9,948,118 B1    4/2018 Patton et al.
10,897,144 B1 *  1/2021 Patton .................... H02J 7/0019
(Continued)

FOREIGN PATENT DOCUMENTS

WO    2016183466 A1    11/2016
WO    2017161372 A1     9/2017
WO    2017191368 A1    11/2017

OTHER PUBLICATIONS

UKIPO Search Report dated Apr. 25, 2019 for Application No. GB1818162.8.

(Continued)

*Primary Examiner* — Edward Tso
(74) *Attorney, Agent, or Firm* — EIP US LLP

(57) ABSTRACT

Disclosed herein is a system comprising: a power source apparatus; a first device and a second device associated with a user; and a server computer. The second device couples to the power source apparatus. The power source provides status information to the first device. The first device sends a communication to the power source apparatus via an application operating on the first device, wherein the communication provides a charging instruction to the power source device and the instruction is based on the status information received from the power source. The power source apparatus charges the second device based on the charging instruction received at the power source apparatus from the first device. The server communicates with the first device to maintain a database relating to at least one of the power source apparatus and the second device and comprising status information.

13 Claims, 5 Drawing Sheets

(58) Field of Classification Search
USPC ........ 320/103, 106, 107, 110, 114, 132, 137
See application file for complete search history.

(56) References Cited

U.S. PATENT DOCUMENTS

| | | |
|---|---|---|
| 2008/0028237 A1 | 1/2008 | Knight |
| 2009/0251008 A1 | 10/2009 | Sugaya |
| 2013/0205159 A1 | 8/2013 | Chen et al. |
| 2014/0091623 A1 | 4/2014 | Shippy et al. |
| 2016/0336745 A1 | 11/2016 | Pandya et al. |
| 2018/0062409 A1 | 3/2018 | Jung et al. |
| 2018/0090957 A1 | 3/2018 | Rao et al. |

OTHER PUBLICATIONS

UKIPO Search Report dated May 7, 2019 for Application No. GB1818165.1.
International Search Report and Written Opinion dated Jan. 8, 2020 for PCT Application No. PCT/EP2019/073779.

* cited by examiner

410

| User ID | Smart power source ID | Last reported status – battery level | Time since last reported status (minutes) | Time until next status report |
|---|---|---|---|---|
| 1014 | 211 | 50% | 4 | 56 |
| 2005 | 254 | 75% | 32 | 28 |
| 2789 | 298 | 33% | 55 | 5 |

| User ID | Second device ID | Last reported status – battery level | Charging parameter (voltage, V) | Time available to charge device (minutes) |
|---|---|---|---|---|
| 1014 | 564 | 40% | 11.5 | 120 |
| 2005 | 301 | 90% | 12.3 | 15 |
| 2789 | 872 | 19% | 12.7 | 40 |

Figure 5B

SMART CHARGING SYSTEM

CROSS-REFERENCE TO RELATED APPLICATIONS

This application is a continuation of International Application No. PCT/EP2019/073779, filed Sep. 5, 2019 which claims priority to GB Application No. 1818165.1, filed Nov. 7, 2018 and GB Application No. 1818162.8, filed Nov. 7, 2018, under 35 U.S.C. § 119(a). Each of the above-referenced patent applications is incorporated by reference in its entirety.

BACKGROUND OF THE INVENTION

Technical Field

Embodiments disclosed herein relate to charging multiple electronic devices, and, more specifically, to a system, a method, and an apparatus that manages charging of multiple electronic devices.

Description of the Related Technology

As communication and connectivity technologies advance and the lifestyle of a typical person becomes more flexible, the number of portable electronic devices that a person owns, as well as the amount of time said person spends using such devices, are increasing. A typical person may own multiple portable electronic devices such as a personal mobile phone, a laptop computer, a tablet, an electronic book, a wearable device (for example, an activity tracker or headphones) and may use and rely on each of these devices in a single day. Consequently, the available battery power of one or more of the devices is likely to reduce during the day and the respective devices may require charging. Typically, each device is associated with a dedicated power pack from which the device can be charged, meaning that a user must carry as many power packs as there are devices. It would be advantageous to make it easier to charge each of the devices.

SUMMARY

According to a first aspect of the present disclosure there is provided a system comprising: a power source apparatus; a first device associated with a user; a second device associated with the user; and a server computer; wherein: the second device is configured to couple to the power source apparatus; wherein: the power source is configured to provide status information to the first device; the first device is configured to send a communication to the power source apparatus via an application operating on the first device, wherein the communication provides a charging instruction to the power source device and the instruction is based on the status information received from the power source; the power source apparatus is configured to charge the second device based on the charging instruction received at the power source apparatus from the first device; and the server is configured to communicate with the first device to maintain a database relating to at least one of the power source apparatus and the second device and comprising status information.

The interactions between the application operating on a first user device, the power source apparatus, the second user device and the server provide a smart charging system that efficiently and flexibly manages the operation of the power source apparatus to provide tailored charging of the second user device, with reduced downtime for at least one of the first user device, the second user device, and the power source apparatus.

The term "smart charging system" is used in relation to the embodiments of the present disclosure to exemplify the functionality of the system in monitoring and managing charging of user devices by the smart power source to provide a flexible and efficient charging system.

According to a second aspect of the present disclosure there is provided a power source apparatus comprising: a power source; a communications interface; a communications circuit; a charging circuit; and a plurality of charging points coupled to the charging circuit; wherein: each of the plurality of charging points is configured to couple to a respective user device to charge said device; the power source is configured to provide power to at least one of the charging points coupled to a user device; the communications interface is configured to transmit, to a first user device operating an application, a first communication comprising status information of the power source apparatus and receive, from the first user device, a second communication comprising a charging instruction for charging the user device, wherein the charging instruction is based on the status information received from the power source; the communications circuit is configured to forward the charging instruction to the charging circuit; and the charging circuit is configured to control the provision of power to the respective charging points by the power source based on the charging instruction.

The term "smart power source" is used in relation to the embodiments of the present disclosure to exemplify the functionality of the power source apparatus in (i) communicating with other devices, such as user devices and a server, to share and receive information to enable the power source to provide customisable charging of a user device; and (ii) monitoring and analysing conditions of the power source, where such analysis is used by the power source in the customisable charging.

A method of managing a charging system comprising a power source apparatus; a first device associated with a user and running an application; a second device associated with the user; and a server computer, the method comprising: sending, by the first device via the application, a charging instruction to the power source apparatus, wherein the charging instruction is based on a status of the second device; in response to the power source apparatus coupling to the second device and subsequently charging the second device according to the charging instruction, sending, by application, information relating to the second device to the server; and updating, by the server, a database relating to the second device based on the information.

The interactions between the application on the first user device, the power source apparatus, the server and the second user device provide a smart charging system that efficiently and flexibly manages the operation of the power source apparatus to provide tailored charging of the second user device, with reduced downtime for at least one of the first user device, the second user device, and the power source apparatus.

BRIEF DESCRIPTION OF THE DRAWINGS

Various features of the present disclosure will be apparent from the detailed description, which follows, taken in conjunction with the accompanying drawings, which together illustrate, features of the present disclosure, and wherein:

FIG. 5A is a logical representation of a database, according to an example.

FIG. 5B is a logical representation of another database, according to an example.

DETAILED DESCRIPTION OF CERTAIN INVENTIVE EMBODIMENTS

Charging System

Figure 1:
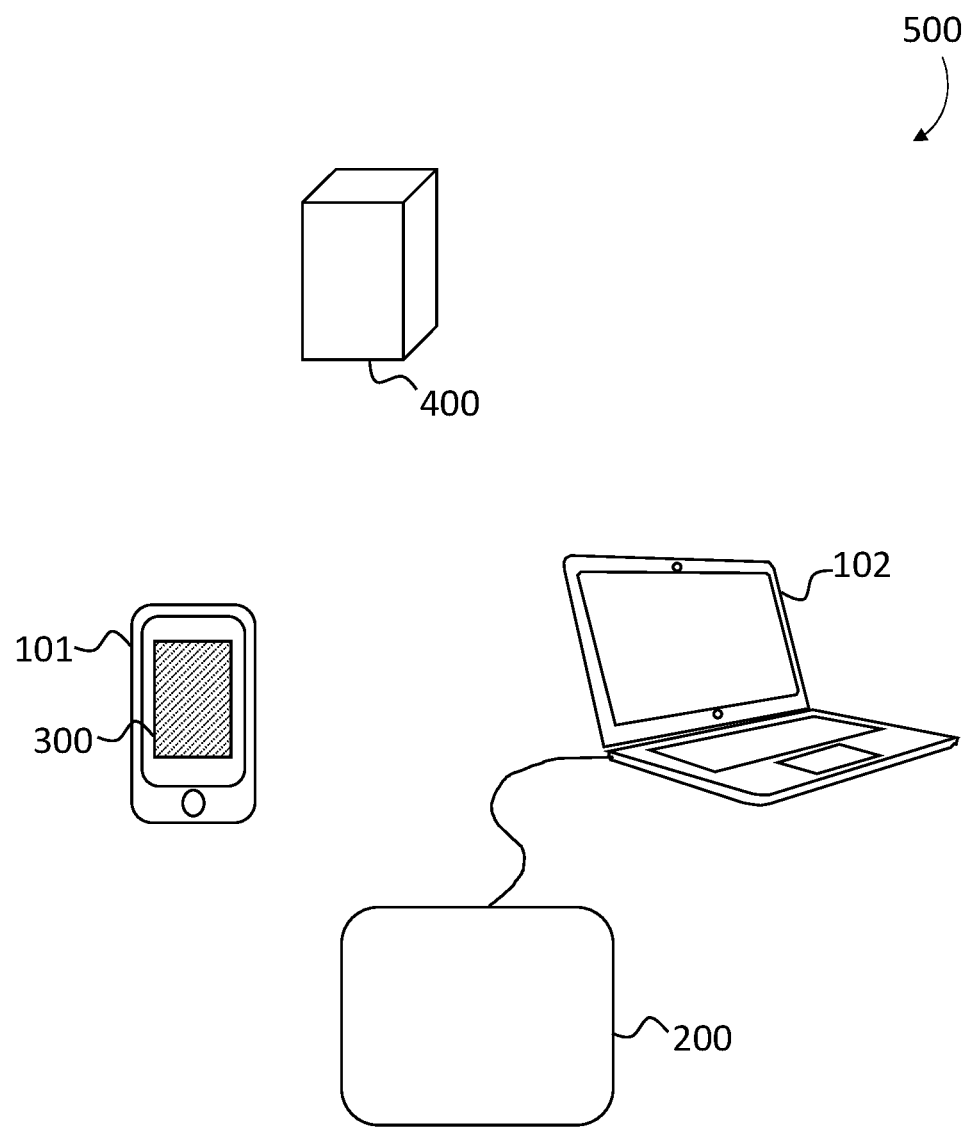
FIG. 1 is a schematic illustration of a charging system, according to an example.

FIG. 1 shows a charging system 500 to which embodiments described herein have particular applications.

The charging system 500 includes: a smart power source 200; a first user device, in the example of FIG. 1 this is a mobile phone 101; a second user device, in the example of FIG. 1 this is a laptop 102; and a server 400. In one example, the server 400 may be a virtual server. The smart power source 200, the first user device 101, the second user device 102, and the server 400 may communicate with one another using wired or wireless communications and/or a combination of both. As an example, the smart power source 200, the first user device 101, and the second user device 102 may have built-in Bluetooth® capability, for instance, the smart power source 200 may include a Bluetooth transceiver. In a further example, the smart power source 200, the first user device 101, the second user device 102, and the server 400 may each have a radio modem to enable cellular connectivity between each entity, for example, through use of LTE, 3G, 4G, or 5G communication standards. In another example, the smart power source 200, the first user device 101, and the second user device 102 may communicate with one another and the server 400 over a Wi-Fi network.

The charging system 500 manages the charging of each device coupled to the smart power source 200, where the smart power source 200 is configured to fully or partially recharge the battery of the respective device(s). The smart power source 200 can charge one or more than one device at the same time. Each device connected to the smart power source 200 may have associated charging criteria or parameters, sometimes referred to as characteristics, such as, minimum and maximum power, voltage, and current parameters. In the example of FIG. 1, the second user device 102 is coupled to the smart power source 200 to be fully or partially charged by the smart power source 200. Accordingly, the second user device 102 may be referred to as a "charging device".

In addition, the charging system 500 monitors and records the status of each of the user's devices that are being or have previously been charged by the smart power source 200. For instance, each device may have a software application 300 installed thereon that is associated with the smart power source 200 and monitors the status of said device. That is, the charging system 500 monitors each of the user's devices independently from one another.

In one example, the status of the smart power source 200 and the status of the user device 102 may be at least one of: remaining charge (for example percentage (%) of battery level); an amount of time until the charge level reaches a predetermined threshold; a current usage of the device (for example, the number of other software applications open or connected charging devices, an amount of processing resources being used, a current power state), and a scheduled or predicted future state (for example, a decrease or increase in the number of software applications in use or the number of connected charging devices, a change to the processing or a power state of the user device).

The smart charging system 500, and in particular, the interactions between the software application 300, the server 400 and the smart power source 200 enable information relating to the smart power source 200 and the user device 102 to be exchanged to determine a charging operation therebetween in accordance with current statuses of both the smart power source 200 and the user device 102. This provides an adaptable, precise and safer way of charging devices compared to a simplistic and direct device to power source relationship.

The first user device 101 is equipped with a software application 300 configured to communicate with the smart power source 200 and one or more of the user devices, for example the second user device 102. The software application 300 facilitates control of the charging operations performed by the smart power source 200 and exchanges information relating to the smart power source 200 and the user device 102 with the server 400. The software application 300 has a graphical user interface (GUI), alternatively referred to herein as an interface.

In one example, the server 400 stores a database of user device profiles and a database of smart power source profiles (410 of FIG. 5A, 420 of FIG. 5B, respectively). Each device profile may contain device-appropriate charging parameters. Each smart power source profile may contain status information and possibly historic usage information. Both the application 300 and the smart power source 200, via the application 300, may query the server 400 for information relating to a user device. For instance, the application 300 may query the server 400 for device-related information for a specific user device coupled to the smart power source 200 and send a charging instruction, based on the device-related information, to the smart power source 200. In one example, the software application 300 may retrieve a plurality of device profiles, or information thereof, corresponding to each device of the user. In some instances, the software application 300 may locally store one or more device profiles. The software application 300 provides a user with the capability to navigate between different device profiles to view and/or modify them.

The device-related information may include one or more of the following: a device name; a device manufacturer; a device model; a device identifier; and one or more charging parameters. The charging parameters may include one or more of the following: a nominal input voltage; a minimum input voltage; a maximum input voltage; a maximum charging current; a minimum charging current; and a device battery capacity. In one example, at least the maximum and minimum charging currents and the device battery capacity are used by the software application 300 to determine a charging current for the power supplied by the smart power source 200 to the user device and generate a charging instruction for the smart power source 200 based on the determined charging current.

Figure 2:
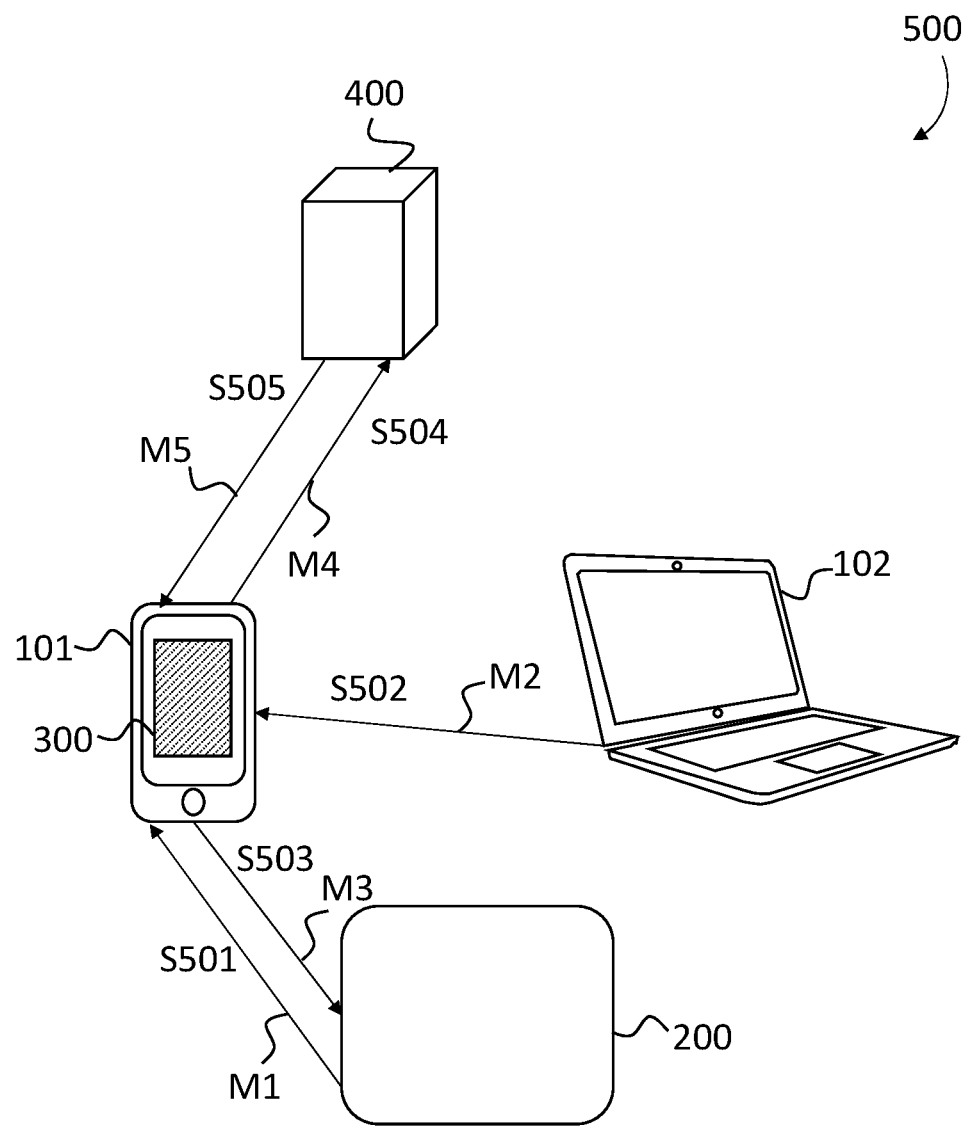
FIG. 2 is a schematic illustration of the charging system of FIG. 1, according to an example.

The charging system 500 is configured to implement charging management, monitoring and recording functionalities. FIG. 2 shows the system 500 of FIG. 1 and a flow of communications exchanged between the component parts of the system 500 as part of a charging process, according to an example.

At step S501, the smart power source 200 provides a first message M1 comprising status information of the smart power source 200 to the software application 300 on first user device 101. In some examples, the first message M1 is sent periodically to the first user device 101.

At step S502, the second user device 102 provides a second message M2 comprising status information for the second user device 102 to the first user device 101. In another example, the second message M2 may originate from or be transmitted via the smart power source 200. In another example, the order of receipt of the messages M1 and M2 may be reversed or occur concurrently. In some examples, the second message M2 is sent periodically to the first user device 101.

In some examples, the first user device 101 generates a request for such information contained in messages M1 and M2, whereas in other examples, the second device 102 and the smart power source 200 automatically provide the status information.

At step S503, the first user device 101 sends a third message M3 to the smart power source 200 via the software application 300 operating on the first user device 101. The third message M3 comprises a charging instruction for the smart power source 200 to charge the second user device 102. The charging instruction is based on the respective status information received by the first user device 101 from the smart power source 200 and the second user device 102. The charging instruction comprises information on how the smart power source 200 should charge the second user device 102. For example, the charging instruction may comprise a time period; a charging voltage; a charging current; and a priority for the second user device 102 relative to other devices connected to the smart power source 200.

In response to the third message M3, the smart power source 200 charges the second user device 102 in accordance with the charging instruction. The server 400 communicates with the first user device 101 via the software application 300 to maintain a database relating to at least one of the smart power source 200 and the second user device 102. In one example, at step S504, the first user device 101 provides status information for at least one of the smart power source 200 and the second user device 102 in a fourth message, M4. The fourth message M4 may be sent to the server 400 in response to a request from the server 400. Alternatively, the fourth message M4 may be sent periodically to the server 400. Either way, the fourth message M4 provides a status report to the server 400 that provides up to date status information that enables the charging process to be adapted by the server 400 in real-time. The server 400 processes and stores the received status information. For example, the server may compare the received status information to one or more of: previously stored status information for the smart power source 200 or the user device 102; and previously stored information for other smart power sources and other user devices. Such comparisons enable the server to determine a usage trend or pattern for the device in question and subsequently predict a future state for said device, which can be used as basis for altering the operation of the smart power source 200 via the software application 300. The server 400 is discussed further in "Charging management—server side" section later in the description. In some examples, the server 400 sends a fifth message, M5, to the first user device 101 to control the software application 300 on the first user device 101 based on said processing. For example, a charging instruction may be generated by the software application 300 (such as, how long to charge the second device 102), to control the smart power source 200.

Figure 3:
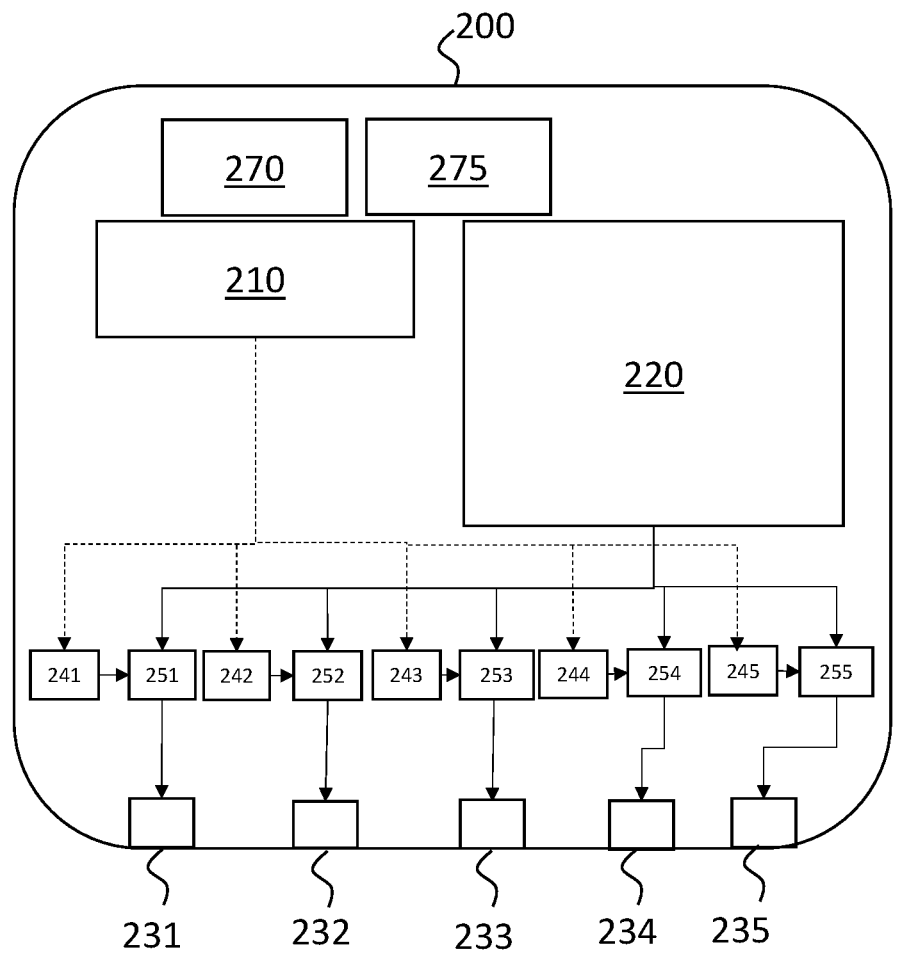
FIG. 3 is a schematic illustration of a power source apparatus, according to an example.

FIG. 3 shows a schematic block diagram of an exemplary smart power source 200. The smart power source 200 has an on-board computer, such as a controller 210, that is a microcontroller chip configured to perform a prescribed functionality, for example, a USBC chip, such as UPD3000. The smart power source 200 also has a battery 220, a communication interface 270, a memory 275, and four charging points 231, 232, 233, and 234. Each of the charging points is coupled to the battery 220. In another example, the smart power source 200 may have a different number of charging points.

The communication interface 270 provides the smart power source 200 with a wired and/or a wireless communication capability to enable the smart power source 200 to communicate with other devices to receive information, such as a charging instruction, that is used by the smart power source 200 for providing customised charging. In one example, the controller 210 and the communication interface 270 may be integrated. In addition, the communication interface 270 may be equipped with one or more of a radio modem, a Bluetooth transceiver, and a Wi-Fi transceiver. In one example, the communications interface 270 is a Bluetooth Low Energy controller, such as an nRF51822 controller.

In a variation to the example of FIG. 3, the controller 210, the memory 275 and the communications interface 270 may be combined on a single circuit board.

The controller 210 is configured to monitor and analyse conditions (for example, the status) of the smart power source 200, where such analysis is fed back to the software application 300 on the first user device 101 and used in the customised charging of devices coupled to the smart power source 200.

As an example, the charging points 231-234 may include: one or more DC charging ports suitable for charging a personal computer (PC), a laptop, and a tablet computer; one or more USB charging ports such as a USB A port and a USB-Type C Power Delivery port; one or more USB Quick Charge 3.0 charging ports; and one or more Qi wireless charging points.

Each charging point may have minimum and maximum charging parameters, such as power, voltage, and current. In one example, charging point 231 is a DC charging port, charging point 232 is a first USB Type C charging port, charging point 233 is a second USB Type C charging port, charging point 234 is a USB A charging port, and charging point 235 is a Qi charging point. Accordingly, if the battery 220 has a charging capacity of 74 Wh, in one example the charging parameters of each type of charging point are set out in Table 1:

TABLE 1

| Charging Point | Power (Watts, W) | Voltage (Volts, V) | Current (Amps, A) |
| --- | --- | --- | --- |
| DC | 36-60 | 12-20 | 1.80-5.00 |
| USB C | 15-60 | 5-20 | 0.75-12.00 |
| USB A | 5-18 | 5-20 | 0.25-3.6 |
| Qi | 5.0 | 5.0 | 1.5 |

Alternatively, if the battery 220 has a charging capacity of 37 Wh, in one example the charging parameters of each type of charging point are set out in Table 2:

TABLE 2

| Charging Point | Power (Watts, W) | Voltage (Volts, V) | Current (Amps, A) |
| --- | --- | --- | --- |
| DC | 37 | 12-20 | 1.85-3.08 |
| USB C | 15-37 | 5-20 | 0.75-7.40 |
| USB A | 5-18 | 5-20 | 0.25-3.60 |
| Qi | 5.0 | 5.0 | 1.5 |

The range of possible power and voltage values between the different charging points provides flexibility in the power supplied by the battery 220 in question and allows the smart power source 200 to charge multiple devices at different powers and/or voltages.

Each charging point 231-235 is associated with a power regulator 251-255. Each power regulator 251-255 is configured to modify the power provided by the battery 220 to the respective charging point. The modification is controlled by a respective controller 241-245 coupled to each power regulator 251-255. Examples of power regulators include: a linear regulator such as BL8062; a low drop out regulator such as ME6203; a step-down switching regulator, such as MP2451; a bi-directional buck/boost controller, such as SC8815; and a digital controller for a wireless power transmitter, such as SP3100.

In addition, the smart power source 200 has capabilities to provide the latest charging protocols implemented by user device manufacturers, for example, Quick Charge 3.0, 4.0, and USB-C PD.

In some examples, the controller 210 may implement a delayed-start process, where each connected device initially receives power at a level below its maximum or optimal charging power, before the power supplied to the charging point is increased. In this way, a window of time is available for a user to de-connect a device that has been incorrectly connected to the charging point or a device for which an incorrect charging parameter has been set or assigned, to avoid damage to said device. In the case of a DC device connected to a DC charging point, the delayed-start charging rate may be determined based on the current input divided by the device's battery capacity. For example, if the device has a 10 AH (Ampere-Hours) battery and the charging current is 5 A (Amps) the safe start charging rate would be 0.5 C.

Figure 4:
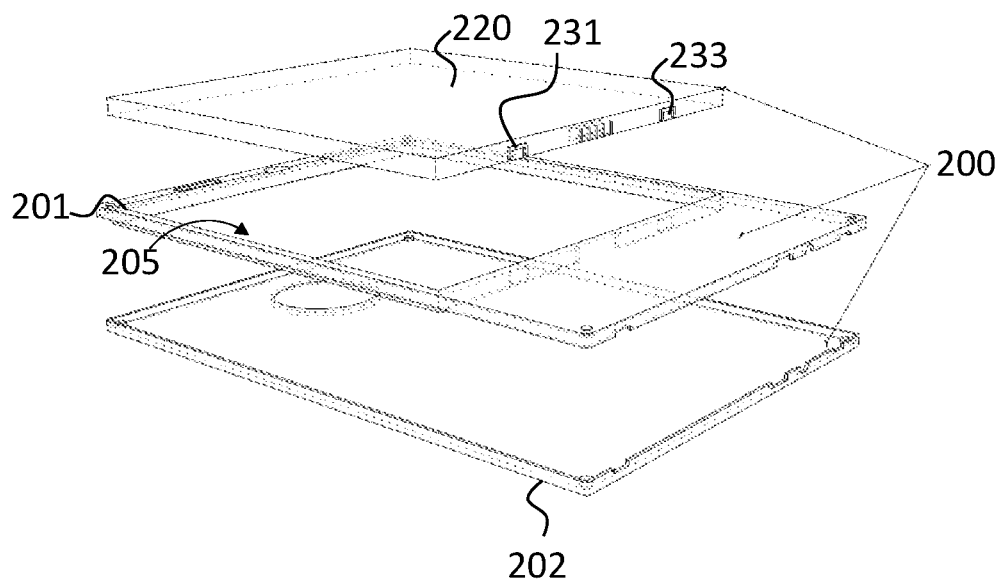
FIG. 4 is a perspective exploded view of the power source apparatus of FIG. 3, according to an example.

FIG. 4 is a schematic exploded view of the smart power source 200, according to an example. Charging points 231 and 233 are depicted on the battery 220. The battery 220 fits within an opening 205 of a first housing portion 201 and the first housing portion 201 connects to a second, complementary, housing portion 202 to form the device 200. The controller 210 and the charging points 232 and 234 are not shown in FIG. 4.

The power source 200 is characterised as a smart device because it can communicate with other devices, such as user devices 101-103 and the server 400, to share and receive information to enable the power source 200 to provide customisable charging of multiple user devices. Such communication enables the smart power source 200 to identify connected devices. The transferring of information with the software application 300 enables the software application 300 and/or the server 400 to collate data relating to each user device 101-103 to predict a time at which one or more of the user devices 101-103 may require charging and thereby identify a time at which the performance of the smart power source 200 may be reduced and thus, when the smart power source 200 itself may require charging. The data collated by the software application 300 and/or the server 400 may be representative of charging behaviour of the user.

Charging Management Via Smart Power Source

The charging operations carried out by the smart power source 200 are controlled by the controller 210 according to a charging algorithm that allocates power to each charging point 231-235 based on one or more charging characteristics (for example, a minimum charging voltage or current) of devices connected to the smart power source 200. The charging algorithm can be adjusted based on a charging instruction received from the first user device 101 via the software application 300. In some examples, the controller 210 is configured to further modify the charging algorithm or the software application 300 is configured to further modify the charging instruction, and thereby modify a charging operation carried out by the smart power source 200, in response to particular internal events at the smart power source 200 that are discussed in this section.

The controller 210 provides instruction to each of the controllers 241-245 to cause the respective power regulators 251-255 to modify the level of power provided to each charging point 231-235 according to a corresponding power allocation and determined by the charging algorithm. The modification may be different for each charging point.

The battery 220 of the smart power source 200 can be removed from the smart power source 200, for example, to be charged, and replaced with one or more other batteries (not shown) to minimise the down time of the smart power source 200. Accordingly, each battery 220 can be understood to be a replaceable battery cartridge.

In some examples, each battery cartridge may comprise a different battery capacity or power level (Ah). For example, a first battery cartridge may be a 10 Ampere hour (Ah) battery whilst a second battery cartridge may be a 20 Ah battery. In this case, the first battery cartridge has a lower battery energy capacity. In another example, the first battery cartridge may have a charging capacity in one of the following ranges: 50-80 Watt-hour, Wh; 60-70 Wh; and 70-75 Wh, and the second battery cartridge may have a lower charging capacity in one of the following ranges: 20-45 Wh; 30-40 Wh; and 35-40 Wh.

The replacing of one battery with another is an internal event that triggers the software application 300 to assess, and sometimes modify, one or more parameters of the charging algorithm on which the controller 210 relies. For example, the software application 300 could instruct the controller 210 to modify a parameter of the charging algorithm based on the energy capacity of the currently inserted battery 220. For example, a user device connected to the smart power source 200 may be charged for less time when the smart power source 200 contains a battery cartridge with a higher energy capacity compared to a battery cartridge with a lower energy capacity. The modification of the charging algorithm may be a result of a charging instruction from the software application 300, where the software application 300 was first notified of one or more internal events at the smart power source 200, for example, the replacing of the battery.

In addition to different charging capacities, the different battery cartridges may have different maximum power outputs, which impacts the amount of power available for distribution. For example, a battery 220 of the smart power source 200 may be replaced by another having a lower maximum power output. In such a scenario, the software application 300 assesses the charging algorithm to identify the impact of the new maximum power output on controller 210 and its operation of the smart power source 200. For example, a number of instances at which the charging algorithm relies on the old maximum power output of the battery may be identified. The controller 210 may then be instructed by the software application 300 to modify one or more parameters of the charging algorithm that relate to power output to incorporate the new maximum power output and thereby change the allocation of power to each charging point. Alternatively, the software application 300 may modify the charging algorithm and send an updated version within a charging instruction to the smart power source 200.

In some examples, the smart power source 200 detects, via the controller 210 and the charging points 231-234, that the battery 220 is discharged to a predetermined threshold level and/or one or more connected user devices is charged to a predetermined threshold level. In response to such detection, the controller 210 causes the at least one charging point 231-234 connected to the one or more user devices to be turned off by modifying the charging algorithm. Turning off a charging point corresponds to stopping the supply of any power to the charging point or reducing the supply of power to a negligible level. In the case of the battery 220 being discharged to a threshold level, the smart power source 200 sends, via the communication interface 270, a notification to the software application 300 running on the user device 101. The monitoring of the discharge and charge levels reduces the risk of over discharging or overcharging of the device in question, preventing damage.

In addition, in one example, the smart power source 200 detects when an external user device has been disconnected. Specifically, the controller 210 receives a notification from the respective controller 241-244 that the corresponding charging point 231-234 (to which the external device was originally connected) has undergone a change in charging behaviour. For example, the respective controller 241-244 may identify a reduced level of resistance at the charging point 231-234. In another example, the controller 210 may identify that the power output at a particular charging point 231-234 has reduced to zero. In this scenario, the controller 210 is configured to determine that an external user device is disconnected from the charging point. The controller 210 is also configured to determine that an external user device is fully charged based on a reduction in the power output to a particular charging point to a low or near zero level, whereby the reduced power output is still supplied to the charging point in order to maintain the connected device at 100% charge. In response to detecting a drop in power output the smart power source 200 can relay this information to the software application 300 so that the software application can update the relevant device profile to indicate that the device is fully charged.

In one example, the smart power source 200 may comprise a temperature sensor (not shown) as part of its circuitry. The temperature sensor is arranged proximal the battery 200 and configured to periodically or continuously monitor the temperature of the battery 200. Each temperature reading is sent to the controller 210 to be forwarded, via the communication interface 270, to the software application 300 on the first user device 101. When the detected temperature reaches a maximum or minimum threshold level, the software application 300 generates a notification that instructs a user of the first user device 101 to charge a device connected to the smart power source 200 using an alternative charging method, for example, to stop using the smart power source 200 for a period of time. In some examples, if a period of time between successive received temperature readings exceeds a predetermined threshold, the software application 300 determines that the smart power source has either partially or fully (turned off) reduced its power and generates a corresponding notification.

Charging Management Via Software Application

In some examples, the charging operations carried out by the smart power source 200 are controlled by both the controller 210 of the smart power source 200 and the software application 300. As described in the previous section, the controller 210 controls the operation of the smart power source 200 according to a charging algorithm that can be adjusted based on a charging instruction received from the first user device 101 via the software application 300. This section describes how the charging instruction may change based on events remote from or external to the smart power source 200, that is, events that are different to those described as "internal events" in the previous section. For example: which device is coupled to the smart power source 200 and its corresponding charging characteristics, a user's charging preference, and information obtained by the software application 300 from sources external to the application (for example, another application running on the user device 101 or the server 400).

A user can interact with the software application 300 to customise or tailor charging of the laptop 102 or any other device coupled to the smart power source 200. Specifically, the user may use the software application 300 to send device-related information to the smart power source 200 prior to charging of the respective device by the smart power source 200 so that the smart power source 200 may identify one or more appropriate charging parameters. In one example, the device-related information identifies the user device to be charged and a user may select the appropriate device-related information from a menu or list provided by the application 300. Such identification may enable the smart power source 200 to select a specific charging point of the plurality of charging points 231-234 to use to charge the respective device. Furthermore, a user can, via the software application 300, set a current level of the power output by the battery 220 to 1 or 2 decimal places. The device-related information may be provided to the smart power source 200 as part of the charging instruction.

As a result, a corresponding device can be charged by the smart power source 200 per its individual requirements, rather than being subject to an inflexible current level applied to all connected devices, which is to say that the smart power source 200 enables precise, tailored control over the charging of devices.

In addition to the above functionalities, the software application 300 may provide and display the following: tracking of the smart power source 200; information on the charging capacity of and number of charging cycles that the battery of the smart power source has completed; alerts in relation to the proximity of the smart power source 200 to the device running the application 300, in this case, the first user device 101; alerts to charge the device running the application 300 or any of the other user devices for which a device profile has been generated and stored at the server, for example, the software application 300 may be configured to monitor the battery level of each of the user's devices, when the available power of the battery of the respective device falls below a threshold level, where the threshold level is customisable by the user through the application 300.

In some examples, based on real-time battery level information received from user devices as part of their "status information", the software application 300 communicates with, for example by sending a charging instruction to, the smart power source 200 in order to maintain battery levels of one or more of the user devices connected to the smart power source 200 within a predetermined battery level range. For example, the software application 300 may instruct the smart power source 200 to maintain the battery level of a device between 20-80% of overall capacity to prolong the lifespan of the battery of the device in question. For instance, in response to a battery level of a user device reaching 80% of full capacity, the software application may automatically instruct the smart power source 200 to stop charging the device.

In some arrangements, devices other than, or in addition to, user device 101 may also run an instance of software application 300.

In addition, the software application 300 can receive, through its interface, input to prioritise the charging of one device over another. In some examples the application 300 provides functionality that enables a user to set a hierarchy of the user's devices. In some examples, in response to the user setting a hierarchy of one or more user devices within the software application 300, the software application 300 generates and sends a corresponding charging instruction to the smart power source 200. In this way, the charging operation of the smart power source 200 is adapted in real-time. The user-defined hierarchy may be stored in the memory 275 used by the controller 210 as basis for charging the different devices until the smart power source 200 receives a further charging instruction that takes precedence over the previously received charging instruction. In such an example, any devices connected to the smart power source 200 may be ranked by the software application 300 based on the hierarchy set by the user and charged accordingly. Based on a charging instruction defining a hierarchy of user devices the controller 210 of the smart power source 200 may allocate full power to the first device at the top of the hierarchy and once this device is charged to a predetermined level (for example, 100%, 80%, 50% of full charge) allocate full power to the next device in the list. Once an external device battery enters trickle charge mode, for example, when the battery is charged to the predetermined level, the controller 210 of the smart power source 200 notifies the software application 300 and decreases the priority of said external device to the lowest level within the hierarchy. This is repeated for subsequent user devices. In some examples, as each of the devices in the user-defined hierarchy is charged in turn, the smart power source 200 may provide real-time updates to the software application 300.

The software application 300 also enables the state of the smart power source 200 to be controlled. For example, the user can cause the smart power source 200 to enter a sleep mode, whereby the software application 300 communicates with the controller 210, via the communication interface 270, to turn off all the charging points and put the communication interface 270 and other components into low energy mode. This communication may be understood to be a form of charging instruction that instructs the smart power source to completely stop charging. Prior to entering the sleep mode, the controller 210 records all active charging points, and in some examples, reports them to the software application 300, so that if the smart power source 200 is instructed via the software application 300 to resume charging, its circuitry and previously active charging points are activated.

As part of controlling the charging by the smart power source 200, the software application 300 may map out different charging scenarios for the user devices connected to the smart power source 200. For example, a particular charging scenario may define a time period and power level for which to charge a connected device. In one example, the software application 300 determines the different charging scenarios based on the available power remaining in the battery 220 of the smart power source 200, any defined prioritisation or hierarchy, and a required, sometimes minimum, power level for the devices. The remaining power level can be either communicated to the software application 300 from the smart power source 200 or determined by the software application 300 based on previous received information relating to the performance of the smart power source 200, for example, the number and charging characteristics of devices charged by the smart power source 200 since the battery 220 was last charged or replaced. For example, if the laptop 102 and the phone 101 are both connected to the smart power source 200 both devices might achieve 50% state of charge, SoC, sometimes referred to as remaining battery capacity or a battery percentage level, but if only one device is connected that device will achieve 100% SoC.

In addition, the software application 300 may predict the remaining charging/discharging time of the smart power source 200 using an algorithm that considers several variables, including at least one of: power capacity of the battery 220, power output of the battery 220, battery cartridge identifier, the discharging/charging curve of the battery, the age of the battery 220 (number of cycles), actual capacity of battery 220, external device 102 battery percentage, usage history of battery 220, and the external device 102 load demand. The software application 300 updates all of these values in real time in order for the algorithm to use up to date data and to determine an accurate remaining charging time for the smart power source 200. The predicted remaining charging time may be used as basis for the charging instruction sent to the smart power source 200.

The discharging/charging curve is representative of the performance of the battery 220 over time and is specific to each battery. In some examples, the curve may be extrapolated, by the software application 300, based on recorded usage of the smart power source 200 in order to predict future performance of the battery 220.

In examples where an unknown device, that is, a device that has not been previously charged by the smart power source 200, is to be charged by the smart power source 200, prior to connecting the device to the smart power source 200 a registration process is carried out by the software application 300. In one example, a first step of the registration process is the downloading of a software client on to the unknown device, where the software client enables the unknown device to communicate with the server 400, and in some cases, provide one or more device characteristics to the server 400. Next, the software application 300 communicates with the unknown device using a communication capability of the first user device 101, for example a Bluetooth interface to request device characteristics and/or charging parameters from the device. Alternatively, the software application queries the server 400 for information on the unknown device. The downloading of software client onto a device allows that device to communication with the software application 300 via the server 400 so is particularly useful for devices that may not be able to communicate with the software application 300 using another communication means, for example, via Bluetooth.

If the server 400 already stores a device profile for the unknown device (for example, because the device characteristics provided to the server 400 by the unknown device match a stored device profile) the matching device profile is added to the user's profile within the server 400 and on the software application 300.

Alternatively, if the server 400 does not contain a matching device profile, the user is prompted, via the software application 300, to scan (for example, take a photograph of) the charger of the unknown device and use a form of optical character recognition (OCR) to derive further characteristics. The scanned characteristics are then associated, by the software application 300, with the charging parameter or device characteristics previously received from the unknown device. Afterwards, the scanned information and the charging parameter or device characteristics are sent to the server 400 to form the basis of a device profile that is added to the user profile stored in the server 400 and by the software application 300.

In one example, the application 300 is configured to request access to another application running on the first device 101 or an application running on the second user device 102, whereby the software application 300 controls the charging of the second device 102 by the smart power source 200 based on information arising from access to the other application. In some examples, the application 300 is configured to transmit the information obtained from the other application to the server computer 400. The first user device 101 is configured to provide to the smart power source 200, via the application 300, a schedule for charging a plurality of user devices, where the schedule is determined by either the server computer 400 or the application 300 based on the obtained information. Consequently, the smart power source 200 charges the plurality of user devices, such as the second user device 102 and another device, based on the schedule.

In one example, the other application may be a calendar application on the user device 101 and the information obtained may be at least one of a time, date, duration and destination for an upcoming journey that the user has planned to make. The application 300 or the server 400 may generate notifications and/or send communications to the smart power source to commence charging of particular user devices before the journey. In one example, the application 300 may notify a user that a specific user device or the smart power source 200 requires charging. In another example, the application 300 may send a communication to the smart power source 200 that specifies a hierarchy of charging for the user's devices based on upcoming events in a user's calendar. For instance, a user's laptop 102 may have the highest priority if the user is going on a work trip. In another example, the software application may prompt a user to pack one or more of: a particular charging cable; for example, an adapter for a foreign country; a particular battery cartridge; and multiple battery cartridges depending on the destination of the journey and duration of the overall trip.

In one example, the software application 300 may determine the type of journey, for example, whether the user is travelling for work, based on historical information, such as user location history, calendar history. In addition, the software application 300 may determine a number and type of notifications and timings thereof to send the user ahead of the scheduled journey based on historical notification information, which may be stored by the server 400.

Once the software application 300 and the other application have established access between them, the software application 300 may routinely scan the other application for any information relating to upcoming trips or events for the user. For example, the software application 300 may scan for flights, flight times, flight duration, origin, destinations.

In another example, the software application 300 may also request access to location services of the user device 101. Based on this, the software application 300 can monitor both the user's calendar and the user's location and combine information obtained therefrom with a level of battery charge of one or more of the user's devices and predicted usage thereof in order to refine the notifications generated and provided to the user via the software application 300.

In another example, the software application 300 may interact with a virtual assistant of the device, for example, Ski, Google Assistant or Alexa, to enable application settings or operations of the application 300 to be changed and controlled via voice commands.

In this way, the charging system 500 adapts based on information obtained from different sources in order to provide flexible and efficient charging.

In some examples, a user may use the application 300 on more than one of their personal devices. For example, the user could download the application 300 onto each desired device. In some examples, the operation of the application 300 on a device triggers the generation of a corresponding device profile and the subsequent storing of that profile on the server 400 for future use, for example, when the user couples that device to the smart power source 200 to be charged. In this way, the user may open the application on a first device and be presented with a device profile from a second device, onto which the user previously downloaded the application. In addition, a software client may be downloaded onto one or more of the user's devices to monitor the battery level of the respective device in real-time and send updates on the battery level to the software application 300 operating on another one of the user's devices. For example, a DC laptop may download a software client to enable to laptop to convey battery information to the software application, either directly or via the server 400. In this way, monitoring of battery levels of other user devices, including laptops, is pro-actively carried out, rather than requiring a request to be received from the software application 300 on another device. In one example, the updates may be sent to the software application 300 (in some examples, via the server 400) in a periodic manner or when the battery level reaches predetermined threshold levels.

Charging Management—Server Side

In some examples, the server 400 may influence the operation of the smart power source 200. In such scenarios, the server 400 may provide information to the software application 300 on which the charging instruction sent to the smart power source is based. This section describes the database(s) stored by the server 400 and the role of the server 400 within the charging system 500.

As previously described, the server 400 receives status information from the software application 300 relating to the one or more of: the smart power source 200, and/or the second user device 102, and any other one or more user devices connected to the smart power source 200 or corresponding to a device profile stored by the software application. User devices on which an instance of the software application 300 is running can interact directly with the server 400. This means the server 400 can receive status information from each device having a software application 300 and relay that information to the software application on the first user device 101. The server 400 also receives and stores status information for a plurality of, and sometimes all, the smart power sources 200 of other users via respective software applications 300 (not shown) that control and report on the corresponding smart power sources 200.

In addition, the server 400 may receive other information from each software application 300 that has been obtained by the application 300 from other application running on the user device 101, such as: historical location services, historical calendar information, future calendar information, historical battery information for each of the user's devices, historical battery information from the associated smart power source 200.

In one example, the status information may be for the battery 220 and include at least one of: a battery identifier, a battery capacity, and a last cycle number of the battery. In some examples, the information is added to a user profile in a database maintained by the server 400. In this way, the first user device 101 provides real-time information to the server 400, which is then incorporated into a database that the server 400 maintains, providing an up-to-date database containing accurate information. As part of a subsequent charging process, the server 400 may provide relevant information to the software application 300 (in some examples, in response to a request from the software application 300) such that the operation of the application 300, and its control over the smart power source 200, is based on accurate information that improves the overall charging process.

The software application 300 can query the database to retrieve information on the smart power source 200 and any of the user devices connected to the smart power source 200 or corresponding to a device profile stored by the software application 300, so a device that is not necessarily connected to the smart power source 200 at the time the query is sent. A user can download the software application 300 on to a chosen device and access the database on the server 400 using the downloaded application 300 on the chosen device.

Accordingly, the server 400 stores information on a plurality of smart power sources 200 and can use such information for controlling the charging carried out by one or more of the plurality of smart power sources 200. In one example, the server 400 may use stored information for a particular user, for example, the battery levels of each of the devices connected to the user's smart power source 200 or any user devices having device profiles stored with the software application 300 and the server 400 that may or may not be connected to the smart power source 200, to generate customised notifications and alerts for the user. The server 400 sends the notifications and alerts to the software application 300 associated with that user. The server 400 operates according to an algorithm that is adjustable based on identification of clusters and patterns in the data stored by the databases of the server for each user or each smart power source 200.

In another example, the server 400 may determine predicted usage of the smart power source 200, such as charging dates and time, based on previously received usage information from the software application 300, for example, an identified usage pattern of the smart power source or one or more of the user's devices In another example, based on the information collected from a user's devices, the server 400 may, possibly in combination with the software application 300, predict a user's charging habits, for example, per user device (including the smart power source) and/or per day. This prediction can be used as basis for generating notifications to the user within the software application 300 on when to charge certain devices, when a user should be bringing the smart power source 200 with them (for example, if one of their devices has a low battery level), when one or more of the user devices and/or the smart power source 200 will run out of battery power. Prediction-based notifications are proactive in nature and provide a charging system 500 with an overall reduced downtime in user devices and the smart power source 200, making the system 500 as a whole more efficient.

Based on the predicted usage, the server 400 may cause the software application 300 to send a charging instruction to the smart power source 200 to increase or decrease current output by the smart power source 200 at particular times and/or days of a week, such as before a predicted period of charging by the smart power source 200. In another example, the software application 300 may use a predicted usage to, for example, notify a user when the battery 220 of the smart power source 200 requires replacing or charging, for instance before an identified period of use. In another example, the software application 300 may send a charging instruction to the smart power source 300 to enter sleep mode for a period preceding a predicted period of use. In this way, the charging system 500 is flexible, efficient, and effective. That is, the predicted usage of the smart power source 200 may be used to refine how the smart power source 200 is controlled to provide a proactive charging system 500 that minimises a user's required input in a charging process.

As described above, the server 400 stores a database of user device profiles, where each profile may contain device-appropriate charging parameters. The software application 300 enables a user to modify a device profile for a particular device and send an updated device profile to the server 400. In addition, the server 400 may maintain a database of smart power source profiles.

The smart power source 200 is an apparatus that can charge DC devices and other device types and the software application 300 stores corresponding profiles for the DC devices. In the examples described above the charging system 500 is embodied as a client server arrangement rather than a device to device arrangement. As such, the software application 300 and server 400 and the communications therebetween enable a device, which does not have the capability to communicate its specific charging requirements to the smart power source 200, to be charged in accordance with embodiments described herein. An example of such a DC device is a laptop. In this case a corresponding device profile can be requested, e.g. by or from the server 400, and the device charging characteristics specified in the relevant device profile will be used to charge the device, rather than according to pre-set, limited values, for example 12V or 16V. Charging in accordance with specific device requirement is a safer way of charging because there is a reduced risk of supplying a harmful level of power to a device.

FIG. 5A shows an example of a first database 410 maintained by the server 400. The database 410 contains device profiles for a plurality of smart power sources. In the example of FIG. 5A, the first database 410 comprises five columns: User ID; Smart power source ID; Last reported status—battery level; Time since last reported status (minutes); and Time until next status report. In other examples, the database 410 may comprise columns containing different information for the plurality of smart power sources.

The first database 410 comprises records for a plurality of users with user identifiers 1014, 2005, and 2789 and their respective smart power sources with device identifiers 211, 254, and 298. The column "Last reported status—battery level" contains status information for each of the smart power sources 211, 254, 298 that has been reported to the server 400 by corresponding first user devices via respective software applications, for example, the user device 101 and the software device 300. In the example of FIG. 5A, the status information is updated periodically and the column "Time until next status report" indicates when the next status report can be expected for each smart power source. For example, the second row containing the user ID "2005" indicates that the server will receive another status report for the smart power source "254" in 28 minutes.

In the example of FIG. 5A, the server 400 receives updates for the database 410 every 60 minutes per smart power source. That is, the time across the columns "Time since last reported status (minutes)" and "Time until next status report" adds up to 60 minutes. Based on the database 410, and the updates thereto, usage information can be derived that relates to the how each of the smart power sources 211, 254, 298 are used over time relative to one another. For instance, the change in battery level per status report indicates how much the smart power source has been used within the period since the previous status report. For example, if the battery level of the smart power source 211 is reported to be 15% in the next report (from 50%) and the battery level of the smart power source 254 is reported to be 60% (from 75%) in the next report, it can be deduced, for example, that the smart power source 211 is being used to charge a greater number of devices than the smart power source 254.

FIG. 5B shows an example of a second database 420 maintained by the server 400. The database 420 contains device profiles for a plurality of second user devices with identifiers 564, 301, and 872 (charging devices). In the example of FIG. 5B the second database 420 comprises five columns: User ID; Second device ID; Last reported status—battery level; Charging parameter (voltage, V); and Time available to charge device (minutes). The data within the "Charging Parameter" may be included in a charging instruction sent to the respective smart power source by the software application 300. The data within the "Time available to charge device (minutes)" column may be derived from a calendar application in communication with the software application 300 on the respective first user device, whereby the calendar indicates when the respective user is next travelling or attending a meeting, as an example. In some examples, the "Time available to charge" may be used as the basis for a charging instruction sent to the smart power source 200 by the software application 300, for example to prioritise charging of the corresponding second device if the time available is lower than a predetermined threshold.

Looking to the user 2005, the database 420 indicates that there are 15 minutes available to charge the second device 301, which currently has a 90% battery level. Based on this, the software application 300 may send a charging instruction to the smart power source 200 to prioritise charging of the device 301 so the battery level of device 301 is increased to as close to 100% as possible in the remaining time.

Before commencing a charging operation in accordance with any of the earlier-described examples, the smart power source may verify information received as part of a charging instruction as part of a per-charging-check to avoid incorrect charging of devices. As an example, a Bluetooth or Wi-Fi connection between a user device running the software application 300 and other user devices to be charged or between the user device running the application and the server 400 can be used to provide a two-step authentication process before charging of the respective user devices. First, the user may set a device charging parameter by interacting with the application 300. Following this, the software application 300 may verify said device charging parameter by communicating directly with the user device in question or the server 400 to request confirmation of the user-set device parameter. In such a scenario, the device parameter may be a device model and an optimal charging input (such as, voltage, current, power).

What is claimed is:

1. A system comprising:
   a power source apparatus;
   a first device associated with a user;
   a second device associated with the user; and
   a server computer;
   wherein:
      the second device is configured to couple to the power source apparatus;
   wherein:
      the power source apparatus is configured to provide status information to the first device;
      the first device is configured to send a communication to the power source apparatus via an application operating on the first device, wherein the communication provides a charging instruction to the power source apparatus and the instruction is based on the status information received from the power source apparatus;
      the power source apparatus is configured to charge the second device based on the charging instruction received at the power source apparatus from the first device; and
      the server computer is configured to communicate with the first device to maintain a database relating to at least one of the power source apparatus and the second device and comprising status information.

2. The system of claim 1, wherein the first device is configured to provide, to the server computer, the status information of at least one of the power source apparatus and the second device, wherein the server computer is configured to process the status information and modify the operation of the application on the first device based on said processing.

3. The system of claim 2, wherein the first device is configured to request the second device for the status information and forward such information to the server computer.

4. The system of claim 2, wherein the first device is configured to request the power source apparatus for the status information and forward such information to the server computer.

5. The system of claim 1, wherein the application is configured to request access to another application running on the first device and wherein the communication sent to the power source apparatus from the first device is based on information obtained from the other application.

6. The system of claim 5, wherein the application is configured to transmit the information obtained from the other application to the server computer.

7. The system of claim 1, wherein the first device is configured to provide to the power source apparatus, via the application, a prioritisation for charging a plurality of devices and wherein the power source apparatus is configured to charge the plurality of devices based on the prioritisation and the prioritisation is configurable using the application.

8. A power source apparatus comprising:
   a power source;
   a communications interface;
   a communications circuit;
   a charging circuit; and a plurality of charging points coupled to the charging circuit;

wherein:
- each of the plurality of charging points is configured to couple to a respective user device to charge said device;
- the power source is configured to provide power to at least one of the charging points coupled to a user device;
- the communications interface is configured to transmit, to a first user device operating an application, a first communication comprising status information of the power source apparatus and receive, from the first user device, a second communication comprising a charging instruction for charging at least one of the user devices coupled to respective charging points, wherein the charging instruction is based on the status information received from the power source and the first user device transmits the status information to a server computer for incorporation into a database maintained by the server computer;
- the communications circuit is configured to forward the charging instruction to the charging circuit; and
- the charging circuit is configured to control the provision of power to the respective charging points by the power source based on the charging instruction.

9. The power source apparatus of claim 8, wherein at least one of the plurality of charging points is a DC charging port.

10. The power source apparatus of claim 8, wherein the power source is a first power source comprising a first power output level and the first power source is replaceable by a second power source comprising a second power output level different to the first power output level.

11. The power source apparatus of claim 8, wherein the charging circuit is configured to:
- determine a prioritisation between the first user device coupled to a charging point and a second user device coupled to another charging point based on a communication received at the power source apparatus from at least one of the first and second user devices; and
- charge the first and second user devices based on the determined prioritisation.

12. The power source apparatus of claim 8, wherein the power source is a first power source associated with a first level of power and is replaceable by a second power source associated with a second, different level of power, wherein the charging circuit is configured to control the provision of power based on which of the first and second power sources are inserted into the power source apparatus.

13. A method of managing a charging system comprising a power source apparatus; a first device associated with a user and running an application; a second device associated with the user; and a server computer, the method comprising:
- sending, by the first device via the application, a charging instruction to the power source apparatus, wherein the charging instruction is based on a status of the second device;
- in response to the power source apparatus coupling to the second device and subsequently charging the second device according to the charging instruction, sending, by application, information relating to the second device to the server computer; and
- updating, by the server computer, a database relating to the second device based on the information.

* * * * *